United States Patent Office 3,311,296
Patented Mar. 28, 1967

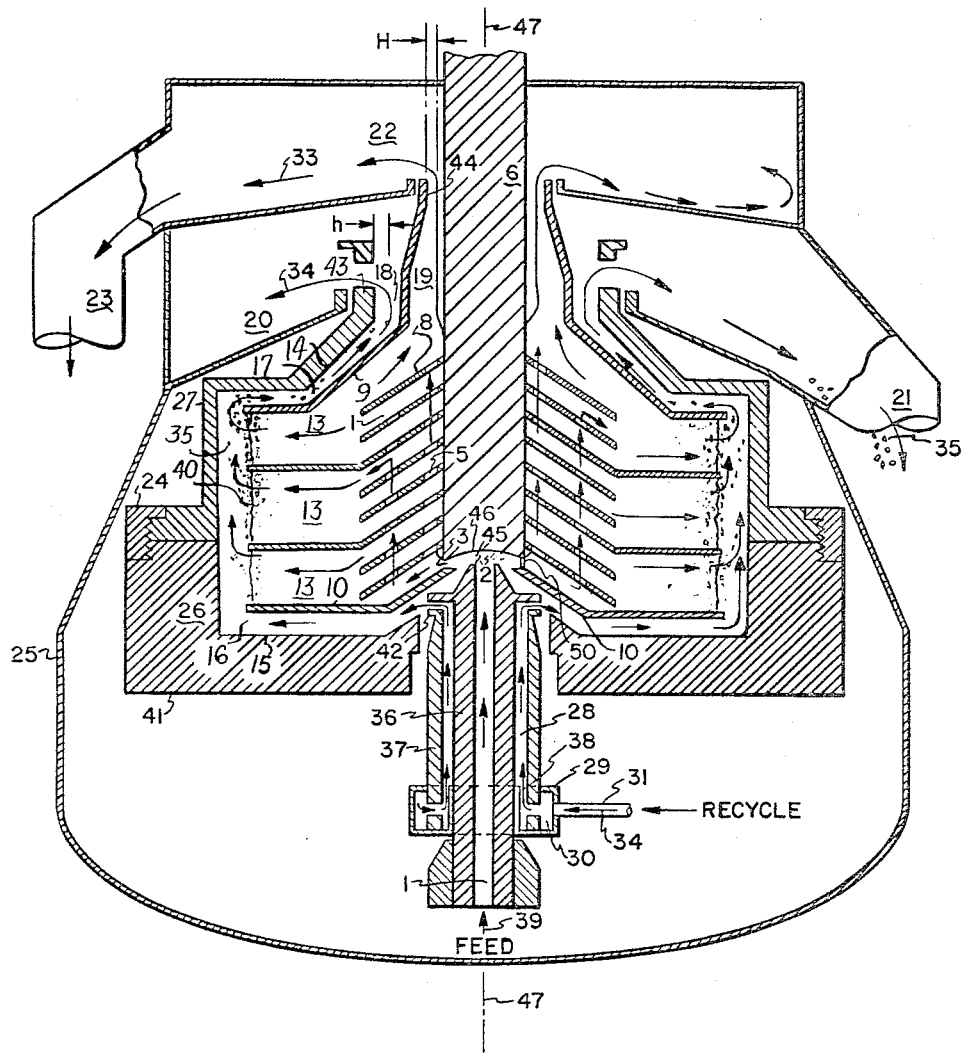
Fig. IA
Leonard B. Torobin  Inventor
By Perry Carvellas
Patent Attorney March 28, 1967 L. B. TOROBIN 3,311,296
SEPARATION APPARATUS
Filed Nov. 12, 1963 9 Sheets-Sheet 2
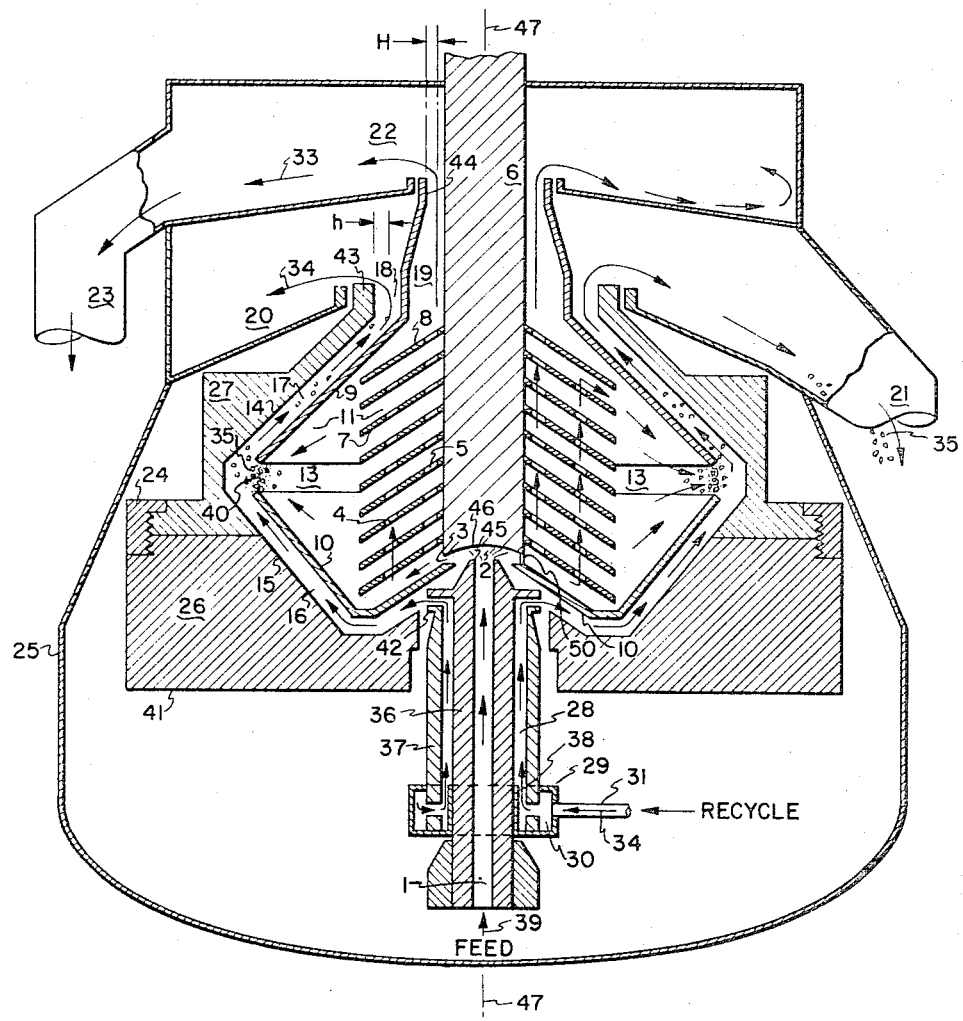
Fig. I
Leonard B. Torobin Inventor
By *Perry Carvellas*
Attorney

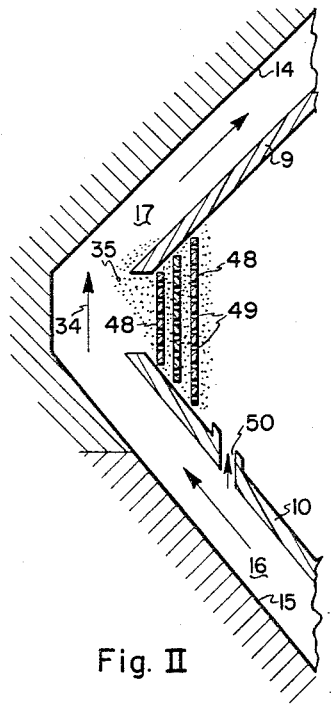
Fig. II
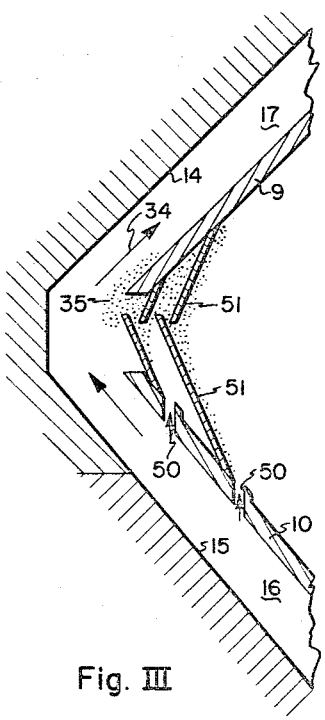
Fig. III
Leonard B. Torobin  Inventor
By Perry Carvellas
Attorney

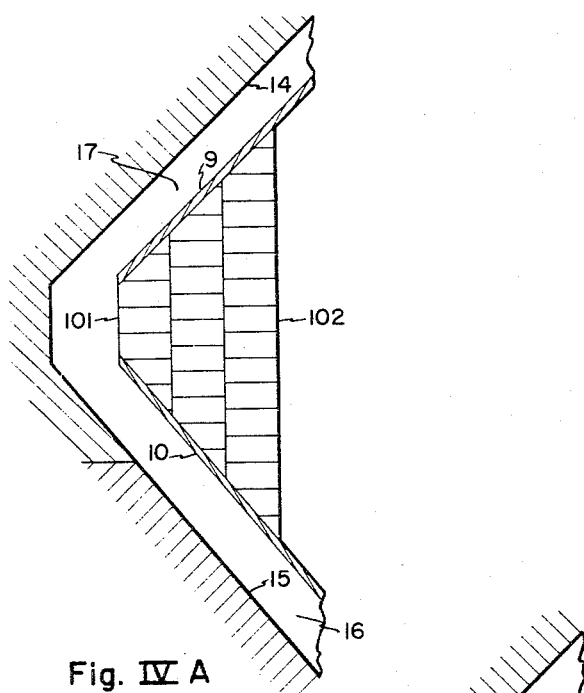
Fig. IV A
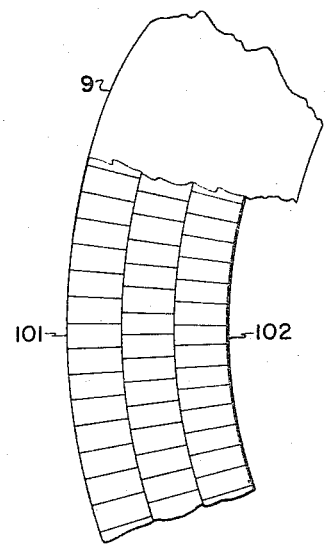
Fig. IV B
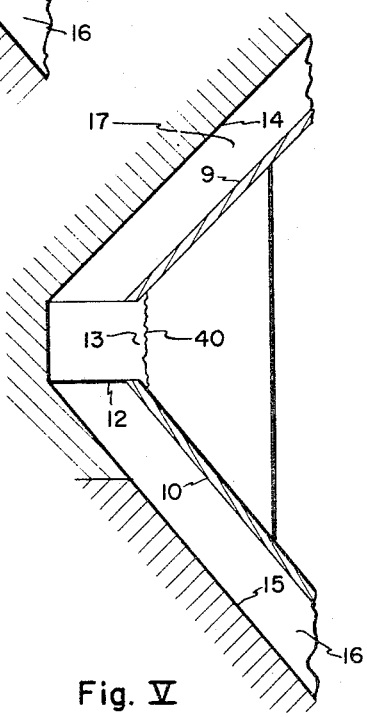
Fig. V
Leonard B. Torobin  Inventor
By Perry Carvellas
Attorney

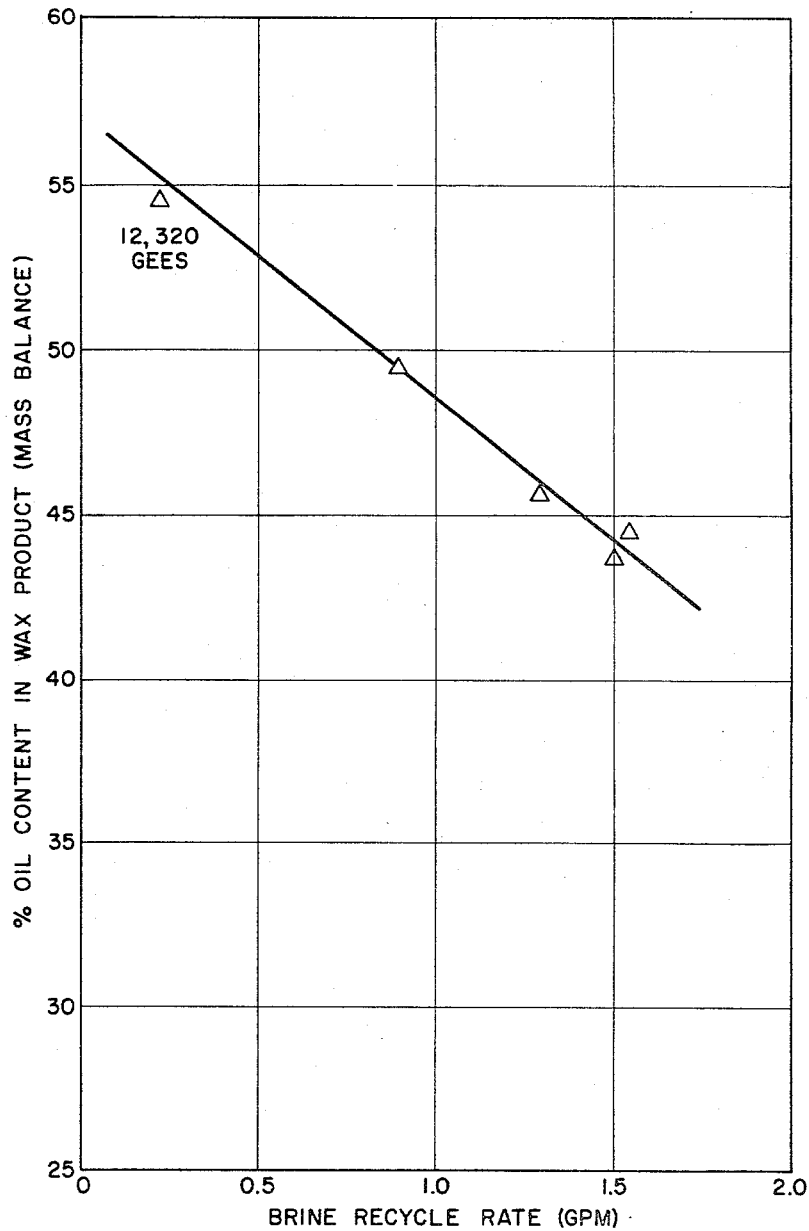
Fig. VI

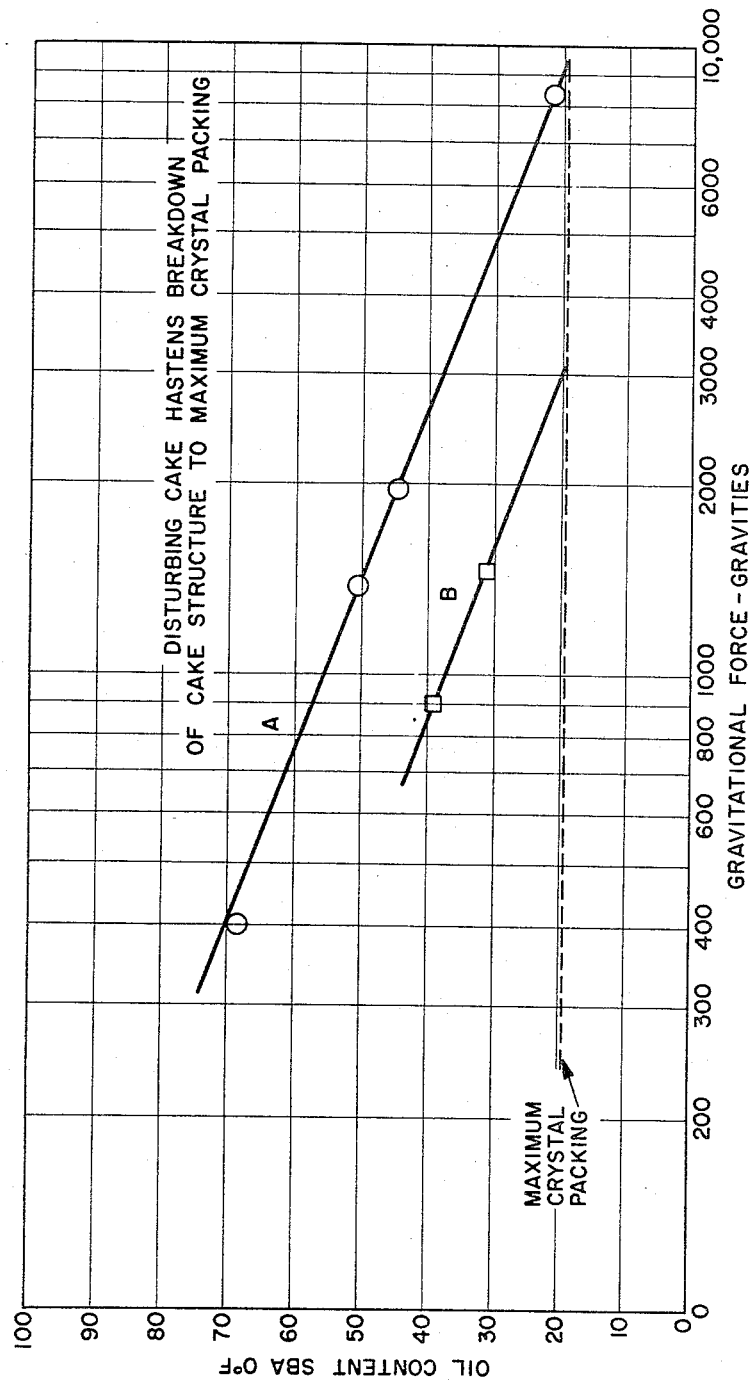
Fig. VII

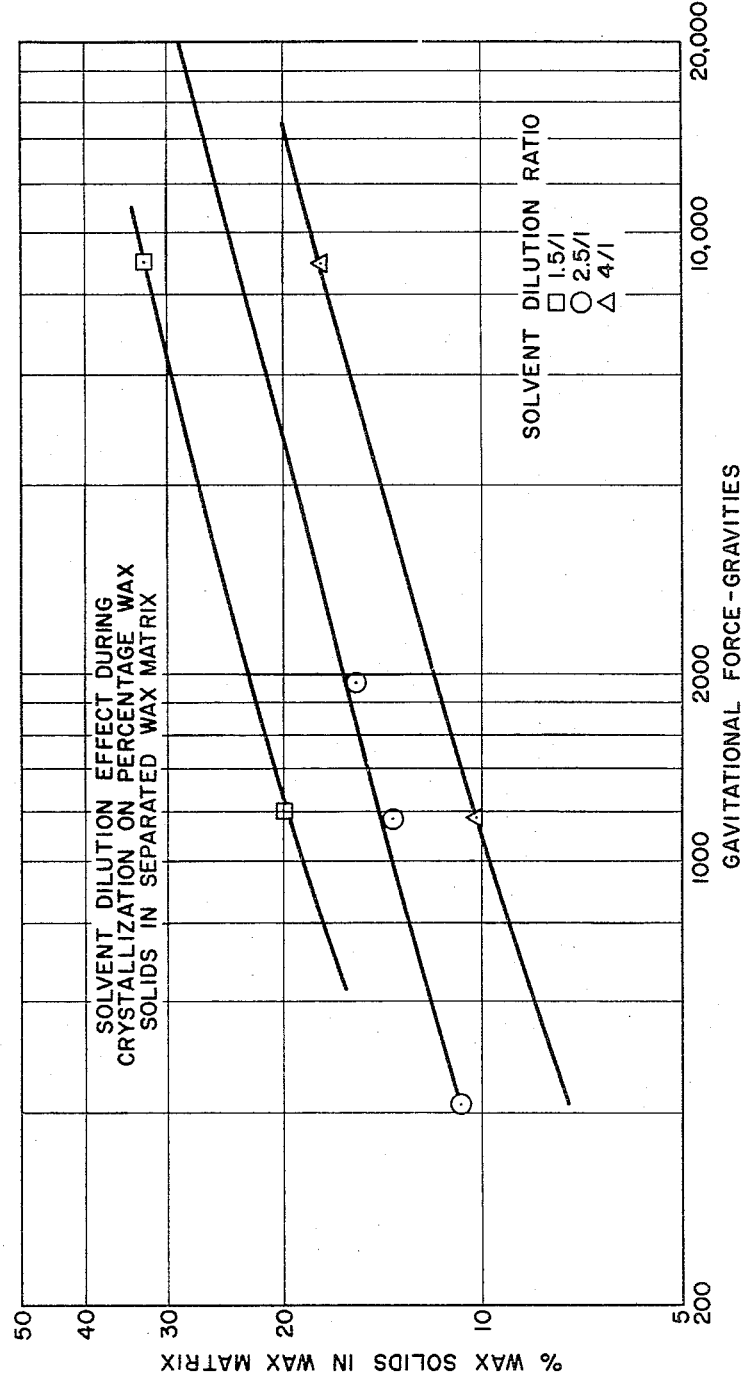
Fig. VIII

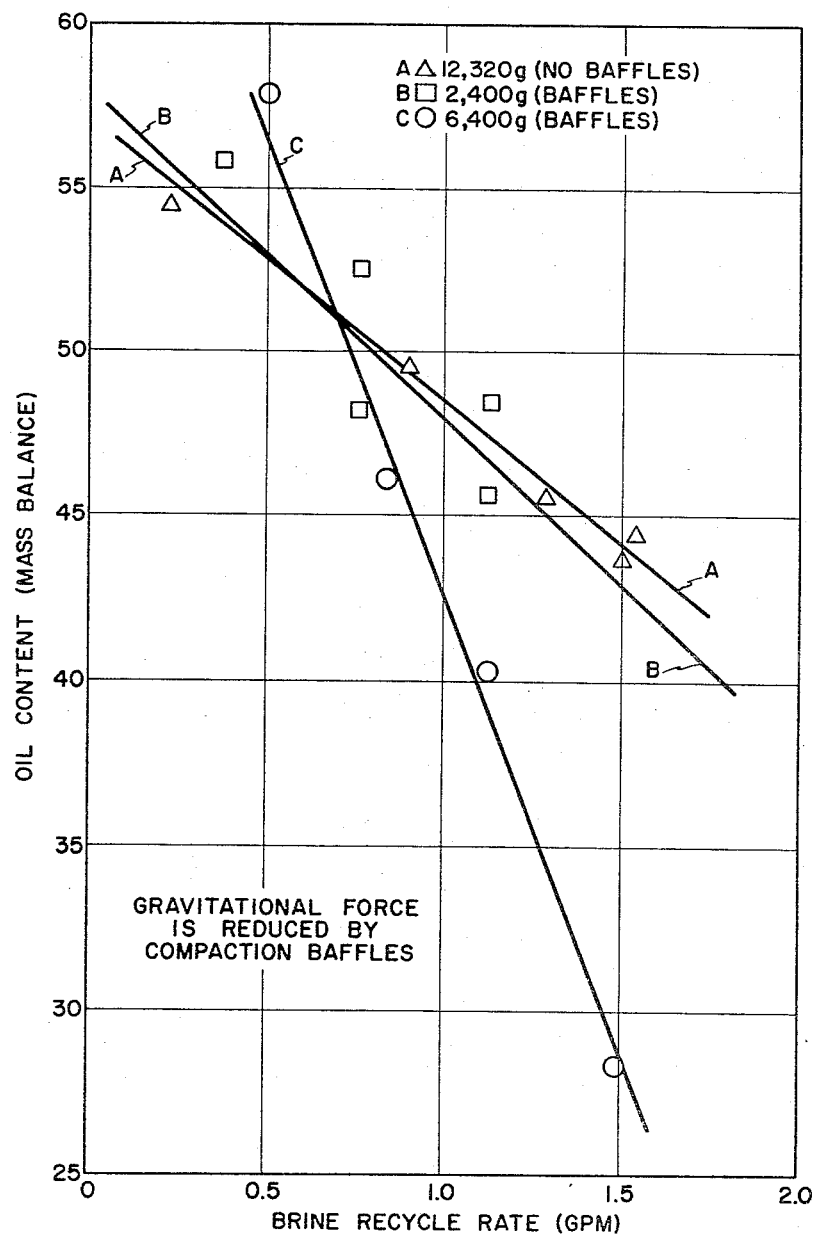
Fig. IX
Leonard B. Torobin  Inventor

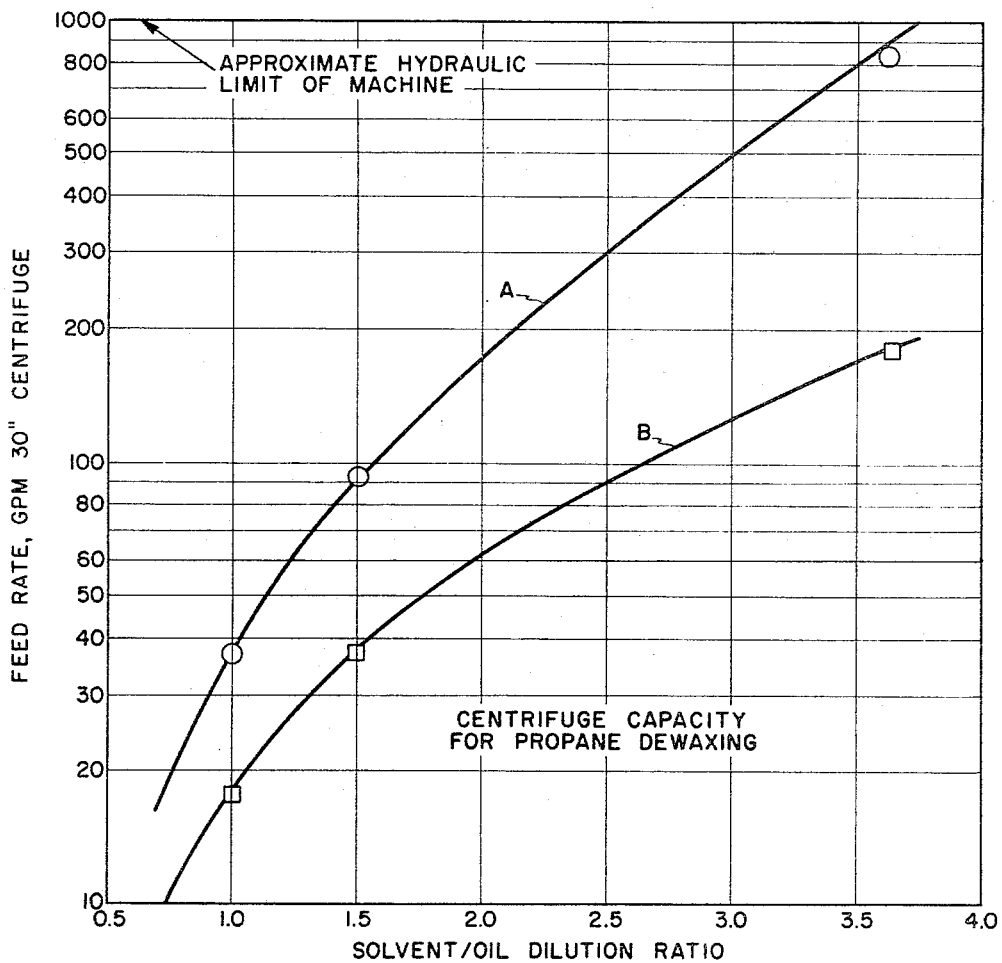
Fig. X

3,311,296
SEPARATION APPARATUS
Leonard Barry Torobin, Newark, N.J., assignor to Esso Research and Engineering Company, a corporation of Delaware
Filed Nov. 12, 1963, Ser. No. 322,734
7 Claims. (Cl. 233—29)

This invention relates to a centrifugal separator and process of using it in the separation of dense materials from less dense materials by centrifugation and is concerned with a centrifuge which operates substantially continuously. This invention relates to a method and apparatus whereby the interface between a light and heavy material undergoing centrifugation separation may be adjusted while the centrifuge is in operation. This invention further relates to the separation of solid particles from liquids lighter than the solid particles.

Specifically, this invention relates to a process wherein the solids are collected at a liquid liquid interface and are removed from the centrifuge by entrainment in a heavy recycled liquid. More specifically, this invention relates to apparatus which breaks up initially compacted solids thereby allowing greater compaction of the solids and more efficient separation from the lighter liquid. This invention further relates to the method of adjusting the position of the liquid liquid interface in a centrifuge by varying the rate of recycling of the heavy liquid to the centrifuge.

In order to minimize friction in high speed centrifuges, all liquid streams fed to the machine are introduced by spraying them through air gaps; that is, the liquid is sprayed into an open air space in the machine and there is no continuous liquid layer extending from the inside of the machine to the outside feed source. Almost all modern high speed disc stack centrifuges operate in this manner. Under these conditions of operation, the only way in which the liquid liquid interface between two liquids in the centrifuge, under the prescribed operating conditions, can be adjusted is by stopping the machines and making mechanical adjustments to the ring neck dams or tube dams. In order to obtain maximum efficiency of separation of the materials fed to such a machine, it is necessary to make such adjustments whenever the density of the feed changes. The change in density of the feed may be due to a temperature variation of the feed or to a change in its composition.

Heretofore, the liquid liquid interface could be adjusted by varying either the feed rate or the rate of feeding an extraneous liquid to the centrifuge where either of the liquids maintained a continuous liquid layer from the feed source to the liquid in the centrifuge. This was possible because a pressure head in the machine could be built up by increasing the rate of introducing either the feed or the extraneous liquid. However, in modern high speed centrifuges, where the liquids are introduced through an air gap, pressure heads cannot be built up in this manner.

Though disc stack centrifuges have been used for the separation of solid particles from liquids, several problems have arisen which have necessitated periodic shutting down of the centrifuge to correct them. For example, the solid particles tend to coat and clog the spaces between stratifying discs, thus rendering the separation in the stratifying zone less efficient or impossible. Most of the conventional units employ discharge nozzles at the outer periphery of the centrifuge bowl through which the solid particles are removed from the centrifuge. These discharge nozzles tend to clog, have excessive wear, and require periodic cleaning and adjustment. One method of overcoming the plugging of the discharge nozzles, while the machine is in operation, is to periodically rapidly empty the centrifuge bowl in a manner which causes a rapid flow of the liquids in the bowl outward, clearing the discharge nozzles and the stratifying discs. A further problem encountered in using discharge nozzles located at the periphery of the centrifuge bowl is that solid particles accumulate and build up on the periphery of the centrifuge bowl between discharge nozzles. After a long enough period of operation, this buildup of solids can extend inward, occupying most of the area of the centrifuge bowl used for the separation of liquids from solids and even inward sufficiently to contact the outer edges and enter the stratifying discs. When this point is reached, the operating efficiency of the centrifuge is reduced practically to a state of inoperativeness.

It is an object of this invention to provide a means which allows continuous positioning of the liquid liquid interface in a centrifuge without shutting down the unit. Another object of this invention is to improve the separation of solids and the clarification of liquids carrying said solids. A further object of this invention is to provide a method of operating centrifuges in an improved manner to increase the degree and efficiency of separation of materials. A further object of the invention is to provide a method of separating solids collected at a liquid liquid interface from a liquid. A further object of the invention is to overcome the problem of discharge nozzle plugging and the problem of the buildup and accumulation of solids on the periphery of the centrifuge bowl. A still further object of the invention is to provide an improved centrifuge and centrifugation process, which allows the separation of solid particles from a light liquid, in a disc stack centrifuge.

Other objects of the invention, together with the foregoing, are obtained in the embodiment of the invention described below.

Now in accordance with the invention, certain modifications were made to a conventional disc stack centrifuge, which enables the adjustment of the liquid liquid interface between a heavy and light liquid in the centrifuge continuously, to compensate for changes in the density of the feed which would normally move the interface. Control of the position of the interface is accomplished by providing an external heavy liquid recycle stream which surrounds and is in communication, through a continuous peripheral opening, with the separation chamber of the centrifuge bowl. Variation of the rate of the introduction of the recycle stream has unexpectedly been found to move, with relation to the centrifuge, the liquid liquid interface between the heavy and light liquids.

In the separation of solids from lighter liquid materials by the use of a heavy liquid recycle stream, it is possible to accurately position the liquid liquid interface, approximately at and slightly within the peripheral opening of the dividing cones, in such a manner that the solid particles being separated collect and float on the heavy liquid at the interface and, by virtue of the upward motion of the heavy liquid, are entrained therein and removed from the centrifuge bowl. By collecting and removing the solid particles in this manner, the difficulties normally experienced in clogging of discharge nozzles, obstruction of the spaces between the stratifying discs, and the accumulation and buildup of solid particles on the peripheral walls of the centrifugal bowl, have been overcome. Further, by having an external means of compensating for movements in the liquid liquid interface in the centrifuge bowl, due to variations in density of the feed to the bowl, it is now no longer necessary to shut down the centrifuge bowl in order to make mechanical adjustments to the ring neck dams or tube dams to relocate the liquid liquid interface.

In one embodiment of the invention a cylindrically shaped separation chamber is used to increase the compaction volume of the centrifuge.

In another embodiment of the invention, the peripheral opening, through which the solid particles migrate outward and are removed from the centrifuge, is modified in such a manner as to provide a means for disturbing the initially formed solids matrix. Examples of suitable means are baffle plates, radial conduits forming a honeycomb section, or orifice openings in plates placed across the peripheral open area, in order that the solid particles collecting at the interface are broken up and allowed to recompact while moving outward from the disc stack towards the peripheral opening. By breaking up the initially formed solids matrix or caked particles and allowing recompaction, a substantial improvement in the efficiency of the separation of the solids from the lighter carrier liquid is obtained without any corresponding decrease in the efficiency of the removal of the solid particles from the centrifuge bowl.

By virtue of the ability to control the liquid liquid interface between two liquid materials being separated in the centrifuge continuously, and without shutting down the centrifuge, more efficient overall operation is obtained. This method of control can be used to more efficiently separate liquids of different density from each other, as well as solids from liquids. Accurate positioning of the interface to compensate for variations in the density of the feed to the centrifuge will render any separation operation more efficient. This method of control obviates the necessity of shutting down the unit to make mechanical adjustments to compensate for movement of the interface, besides giving a much more efficient means for adjusting the interface.

When utilizing this invention to separate solid materials from a liquid, if the liquid containing the solids is not lighter than the solids, it should be diluted with a sufficient quantity of lighter diluent material so that the solids are more dense than the resulting light solution. This allows the solid particles to flow outward under the influence of the gravitational field and the lighter material to flow inward and pass axially and upward and out of the centrifuge. The heavy recycle liquid is selected so that it is immiscible with the light liquid and of greater density than both the light liquid and the solid particles. This allows the solid particles to float on the heavy liquid at the liquid liquid interface separating the heavy and light liquid.

FIGURE IA is a diagrammatic section of a generally vertical plane through the diameter of a centrifuge having a generally cylindrically shaped separation chamber.

FIGURE II is a fragmentary diagrammatic view showing in detail a modification wherein orifice plates have been constructed in the outer peripheral area of the centrifuge bowl.

FIGURE III is a fragmentary diagrammatic view showing in detail a modification wherein baffle plates have been constructed in the outer peripheral area of the centrifuge bowl.

FIGURE IV is a fragmentary diagrammatic view showing in detail a modification wherein radial conduits forming a honeycomb section have been constructed in the outer peripheral area of the centrifuge bowl. FIGURE IV($a$) is a side view and IV($b$) is a sectional top view.

FIGURE V is a fragmentary diagrammatic view showing in detail a radial peripheral accelerator vane.

FIGURE VI is a graphic representation showing the effect on the efficiency of separation of the solid particles from the lighter liquid by variation of the heavy liquid recycle rate.

FIGURE VII of the drawings is a graphic representation showing the effect of providing a mechanical means at the liquid liquid interface to disturb the solid particle cake during compaction to promote drainage of the lighter liquid from the solid particles.

FIGURE VIII of the drawings is a graphic representation showing the effect of the solvent to liquid feed ratio on the separation of the solid particles from the lighter liquid.

FIGURE IX of the drawings is a graphic representation showing the effect on the percentage liquid in the separated solids as related to the use of a disturbing means, the effect of gravitational field and recycle rate of heavy liquid.

FIGURE X of the drawings is a graphic representation showing the centrifuge capacity for propane-wax-oil separation.

In accordance with this invention, solid materials can be separated from liquids. To carry out the process of this invention, however, the solid materials must be heavier than the liquid. The density of the liquid can be adjusted, if necessary, by the addition of a light liquid diluent to it. A suitable feed would be any liquid in which there were heavier solid particles. A specific application would be to the separation of solid materials crystallized or precipitated from solution from their solutes. A specific feed material, for example, would be a hydrocarbon oil containing crystallized wax particles. The centrifuge, in this case, would be used to separate the crystallized wax particles from a hydrocarbon oil-solvent solution.

Any heavy recycle liquid can be used which is heavier than the solid particles and immiscible with the light carrier liquid; for example, water, selected hydrocarbon streams, aqueous salts, brines, liquid metals, etc.

In order to carry out the invention, the liquid containing the solids must be lighter than the solids and the solids must be lighter than the heavy recycle liquid and the two liquids should preferably be partially or totally immiscible. In order to make the separation of the solid particles from the lighter carrier liquid, it has been found advantageous to add a wetting agent to the material being treated which preferentially wets the solid particles being separated and causes them to live (accumulate) in the heavy liquid at the liquid liquid interface instead of floating on the heavy liquid and existing in the light liquid at the interface. Though it is advantageous, the use of a surfactant does not constitute a necessary feature of this invention.

The temperatures at which the various separations can be accomplished in accordance with the invention will depend on the materials being separated. Where wax is being separated from hydrocarbon oils and, depending upon the solvent used, temperatures of $+100°$ F. to $-100°$ F. are used. The separation may be carried out at ambient pressures, or by sealing the centrifuge unit, at pressures up to about 150 p.s.i.g., for example. Generally, where the centrifuge is used to separate wax from a waxy oil mixture obtained from a propane dewaxing operation, for example, pressures of 15 to 45 p.s.i.g. are preferred.

In carrying out the invention to separate wax from hydrocarbon oil solvent solutions, it was unexpectedly found, contrary to the teachings of the art, that more efficient separation of the wax crystals from the hydrocarbon oil solvent solutions are obtained by minimizing the solvent to oil ratio during crystallization. In accordance with this invention, improved separation efficiency is obtained by using from a 0.5/1 to 5/1 of solvent to waxy oil feed during the crystallization process. Preferably, solvent ratios of 1/1 to 2/1 can be used.

The invention is particularly useful in separating solid particles from liquids containing them wherein the solid particles are in the range of the size of 1 micron to ¼ inch. However, particles of the size 10 to 500 microns may also be efficiently separated from light liquids. In some situations where the particles to be separated are very near the density of the light liquid, even larger particles can be seperated in the apparatus of this invention. This is possible in part due to the absence of discharge nozzles. The feed rate of the material to be treated in the centrifuge will depend on the size and capacity of the unit and, for commercial size units of about 30 inch bowl size, for example, will be 50 to 1000 g.p.m. The recycle rate of heavy liquid will be determined by the particular separation being carried out and by the densities of the heavy recycle liquid and the lighter feed material. In commercial size units of about 30 inch bowl size, for example, it could be expected that recycle rates of 2 to 100 g.p.m. can be used. In units of about 45 inch bowl size used for dewaxing, the recycle rates can be 2 to 200 g.p.m. Commercial centrifuge units operate at $g$'s in the range of 1000 to 15,000 and, more commonly, in the range of 2000 to 12,000.

The improvements to the disc stack centrifuge can be used in a number of different applications and are susceptible to various different modes of operation. They are practically embodied in a form substantially as illustrated in FIGURES I through V. The centrifuge is designed to operate with a liquid medium carrying solids of various sizes, shapes, densities, and other characteristics, more or less in suspension, and such solids are to be removed from the liquid in order to form a concentrated discharge of solids and a substantially clear light effluent liquid.

Referring generally to FIGURES I and IA, in order to carry out the invention a rotatable separator bowl, or separator 41, mounted in a stationary hollow rotor housing 25 is provided. Housing 25 and bowl 41 are substantially symmetrical about a central vertical axis 47. A feed stream 39 containing a light liquid and solid particles is obtained from a suitable feed source not shown and introduced into a central passage 1, in hollow conduit 36, which is not connected to and does not rotate with centrifuge bowl 41. A feed stream is jetted through orifice plate 45 and through an air space into fed inlet chamber 2 at the uppermost part of conduit 36 and impinges on target plate 46. Due to the centrifugal forces applied, the feed is thrown radially outward through opening 3 in the base of center post 6 into the inner chamber of separating space 11. The solid liquid mixture passes upward into the nested frusto-conical stratifying discs 7 which form the disc block making up the inner chamber of separating space 11.

The feed passes upward in the stratifying discs through distribution holes 4 in the conical discs 7. The heavy solid particles pass outward, and the lighter clarified liquid passes inward and ascends axially through holes 5. The feed introduced to inlet chamber 2 is directed radially outward by centrally located accelerator vanes not shown, and by struts 50 which connect conical member 10 and center post 6. Stratifying discs 7 and conical top disc 8 are supported on center post 6. The discs are connected to each other as well as to conical members 9 and 10 in a conventional manner. Stratifying discs 7 which form the inner chamber of separating space 11 effectively separate the solid particles from the light liquid. The space from the outer edge of the disc stack outward to the peripheral opening 13 forms the outer chamber of separating space 11. The outer chamber separates the light liquid from the solid particles which solid particles migrate outward. The solid particles migrate to and are collected at or proximate to peripheral opening 13 and float on the liquid liquid interface 40, between the light liquid 19 and the heavy recycle liquid 34.

Peripheral opening 13 is formed at its upper limit by superimposed conical member 9 which constitutes an upper conical shell and which also acts as a dividing cone to separate the discharging light liquid from the discharging heavy liquid. The lower limit of peripheral opening 13 is formed by conical member or shell 10 which is affixed to the base of center post 6 by connecting struts 50 and to main body portion 26 by conventional means and which extends downward, outward, and upward from the central axis. Conical member 10 forms a dividing cone which separates the incoming recycle liquid from the solids and light liquid in outer separation chamber 11.

Conical members 9 and 10 are connected to and rotate with center post 6. At the outer edges of conical members 9 and 10 contiguous with the peripheral opening are located radially oriented peripherally spaced accelerator vanes 12, not shown (see FIGURE V).

A superimposed conical member to shell 9 is formed by the inner surface 14 of the top portion 27 of the separator bowl 41. Similarly, a superimposed conical member to conical shell 10 is formed by the inner surface 15 of the main body portion 26 of the separator bowl 41. This configuration provides areas 16 and 17 completely surrounding separation chamber 11 through which the heavy recycle liquid is conducted. When the centrifuge is in operation and separation chamber 11 is filled with a light liquid and solid particles, and areas 16 and 17 surrounding the separation chamber are filled with heavy liquid, a liquid liquid interface 40 is formed at peripheral opening 13, on which interface float solid particles 35. The rotor 41 of the centrifugal separator or bowl is formed by main body portion 26 and top portion 27, which portions are joined together by clamping ring 24.

Heavy recycle liquid 34 is introduced into passage 16 in the following manner: The heavy component 34 is fed through heavy liquid conduit 31 and introduced into concentric portion 29 through radial openings 30 into concentric annular passage 28. Annular passage 28 is formed by the inner wall of cylinder casing 37 and the outer wall of conduit 36. Radial openings 30 are incorporated in casing 37 and communicate with conduit 31 and annular passage 28. The incoming heavy component flows upward in annular passage 28 and is jetted through nozzle 42 and an air space into area 16 impinging on the lower surface of conical member 10. Accelerator vanes, not shown, accelerate the heavy liquid throwing it outward from the central axis. Angular acceleration can also be provided by radially oriented tubes or ducts in lieu of area 16. Hollow conduit 36 at its uppermost part flares outward to form nozzles 42.

Control of the rate of introduction of the heavy component accurately positions interface 40 near and approximate to peripheral opening 13. The passage of the heavy component outward, and tangentially around peripheral opening 13 entrains therein solid particles 35, carrying them upward through passage 17 to the discharge outlet 18 for the heavy component overflowing weir 43. Angular motion to the liquid can be avoided by using conventional radially disposed tubes or ducts in area 17 and 18. The heavy component overflows into chamber 20 and is removed from centrifuge housing 25 via conduit 21. The lighter component comprises substantially all of the volume of separating chamber 11. However, the outer portion of the separating chamber contains a mixture of the light component and the solid particles, the concentration of solids increasing in the outward direction; whereas, the inner chamber contains primarily the lighter component and decreases in solids concentration in the inward direction. Lighter component 33, free of solid particles, travels upward along the surface of center post 6 through holes 5 to discharge outlet 19 and is conveyed over weir 44 into chamber 22 and is removed from the centrifuge housing via conduit 23.

Centrifuge bowl 41 is mounted via an extension of center post 6 by a connecting spindle not shown, which extends upward through housing 25, so that it may be driven by an appropriate power source and rotate freely in stationary housing 25. Conduit 36, concentric cylindrical casing 37, and cylindrical portion 29 are constructed contiguous to conduit 36 and bowl 41 but remain stationary and do not rotate with the bowl 41.

The geometric configuration of the centrifuge bowl and of the stratifying discs, and of the relative volume of the inner separation chamber made up of the stratifying discs, and the outer separation chamber, as well as the angle of the discs, will be determined, to a large extent, by the type of feed being treated. The separating chamber can be generally conical in shape as in FIGURE I or cylindrically shaped as in FIGURE IA. Generally, when a feed such as waxy hydrocarbon oil is to be treated to remove precipitated wax crystals, the apparatus described in FIGURES I and IA would be suitable. The spacing between the stratifying discs would also depend on the type of material being treated. Whether the machine is top hung, bottom hung, or whether or not the centrifuge is pressurized is not critical to the invention, but would be a matter of choice to anyone implementing the novel features described. Obviously, the feed to be treated and separated, as well as the heavy component, can be introduced in either the top or the bottom of the centrifuge, as well as be withdrawn from the respectively opposite ends or the same ends. In order not to overly complicate the drawing, the conventional accelerator vanes normally centrally positioned approximate to the inlet feed chamber, or the heavy liquid component inlet, have not been shown.

Another embodiment of the invention is described in FIGURE II of the drawings, which is an enlargement of the area of the peripheral opening 13. A means is provided whereby the solid particles matrix formed by solids, separated from the feed liquid and thrown outward by centrifugal force, are broken up. Contiguous to liquid liquid interface 40 is constructed a series of plates 48 having orifice openings 49 which weaken and break up the initially formed solids matrix collecting at the liquid liquid interface, thereby allowing greater compaction of the solids 35 at the interface and a better separation of the light liquid from the solid particles which liquid, on being released from the solid particles, flows back inward into the separation bowl. In order to facilitate breaking up of the solid particles at the interface and passage through the orifice openings 49, in plates 48 small holes 50 may be provided in conical shell 10 through which heavy liquid component may pass and promote movement of the solid particles through the liquid liquid interface into the heavy component stream.

FIGURE III is a similar figure to that of FIGURE II with the exception that baffle plates 51 are constructed contiguous to liquid liquid interface 40 which weaken and break up the initially formed solids 35 matrix floating on the liquid liquid interface, thereby allowing greater compaction of the solids at the interface and a better separation of the light liquid from the solid particles. As before, the movement of the solid particles through interface 40 may be enhanced by the use of a secondary heavy stream entering the baffle areas through openings 50.

In the separation of solid particles from liquids in a centrifuge, the volume bounded by the outer edge of the disc stack, peripheral opening 13, at the top by dividing cone 9, and at the bottom by dividing cone 10 is normally subject to inefficient separation of the light liquid phase from the solids due to swirling of the liquid phase. This hinders the establishment of a sharp concentration gradient of the solid particles towards the liquid liquid interface. In addition, the solids in this area initially form a matrix containing a large volume of occluded light phase. Compression of this type of matrix to remove the occluded light phase requires a long resonance time at high gravitational forces. Even under these conditions, maximum removal of occluded light phase is not obtained.

Applicant unexpectedly found that by providing in this volume, in the outer separation chamber, staggered honeycomb sections relatively outward from the outer edge of the disc stack to the peripheral opening 13 that linear radial outward flow of the solids is obtained while, at the same time, swirling of the light liquid phase is prevented. This apparatus results in obtaining a sharp solids concentration gradient towards the liquid liquid interface and thereby allows greater compaction of the solids matrix at a given gravitational field. The staggering of the honeycomb sections also helps to weaken and break up the initially formed solids matrix as the solids pass outward and impinge upon the leading edge of the successive honeycomb sections. This weakening allows greater compaction of the solids at the liquid liquid interface and releases occluded light phase, and a better separation of the light liquid from the solid particles is obtained. The liquid, on being released from the solid particles, flows back inward through the honeycomb sections into the disc stack and out of the centrifuge. It is found that improved separation of solids from light liquid, at shorter residence and at lower gravitational field, is obtained Referring to FIGURE IV(a) of the drawing, a side view of the staggered honeycomb sections is illustrated. At the top, the honeycomb section is bounded by dividing cone 9; at the bottom, by dividing cone 10. The inner edge of the honeycomb section terminates at the outer edge of discs 7. The outer edge terminates at peripheral opening 13. The liquid liquid interface is approximate to peripheral opening 13 and within the honeycomb section.

FIGURE IV(b) is a pie section of a top view of the honeycomb section which occupies the peripheral volume described.

FIGURE V of the drawings shows peripheral accelerator vanes 12 radially attached, and approximate to peripheral opening 13 and to liquid liquid interface 40, which are used to maintain the angular velocity of the liquids and separated solid particles at or near the liquid liquid interface. The inner edge of the accelerator vane terminates at the outer edge of discs 7 and the outer edge of the vane extends outward to the inner surface of the centrifuge bowl. This type of accelerator vane can be used in the apparatus of both FIGURES I and IA.

In accordance with a preferred embodiment of this invention, solid particles are separated from a light liquid in which they are mixed. The description of this embodiment will be made with a general reference to FIGURE I of the drawings. The feed 39 is fed to a high speed centrifuge through central passage 1. The feed is sprayed into feed inlet chamber 2 which is formed in the bottom of center post 6 through orifice plate 45 and impinges on target plate 46 and is thrown outward through opening 3 which communicates with inlet chamber 2 and the inner chamber of separating space 11. The outward motion of the feed is imparted by the centrifugal force of the rotating separator bowl 41 and the force applied by centrally spaced accelerator vanes in the inlet chamber which are not shown. The feed passes outward and then upward through distribution holes 4 in the nested frusto-conical stratifying discs 7 which form the disc block and the inner chamber of separating space 11. By virtue of the centrifugal force applied to the solids light liquid feed mixture within the disc block, the heavier solid particles are thrown radially outward and the solid free lighter liquid passes inwardly towards center post 6, then axially upward through holes 5. The solid free light liquid overflows weir 44 via discharge outlet 19. The g's at which the centrifuge is operated, and the relative density of the light liquid and the heavy recycle component, determines the horizontal radial distance "H" at which the light liquid forms a crest in passing over weir 44 and into overflow chamber 22. The light liquid is removed from chamber 22 via overflow conduit 23.

In carrying out the invention, a heavy liquid component 34 is fed to the centrifuge through conduit 31, openings 30, and concentric annular passage 28, through which it passes. The heavy liquid is sprayed through an air space into passage 16, and is thrown radially outward by centrifugal force. The heavy liquid component is angularly accelerated by accelerator vanes located in the base of the centrifuge which are not shown. Sufficient amounts of heavy liquid are continuously fed to the centrifuge to substantially fill passages 16 and 17 and to overflow weir 43. Light liquid component mixed with solids fills separation space 11. A liquid liquid interface 40 between the heavy and light liquid components is established approximate to peripheral opening 13.

The heavy liquid component is selected so that it is heavier than both the light liquid component and the solid particles being separated. The solid particles 35 are thrown outward and accumulate at the liquid liquid interface 40, forming a boundary of solid particles of approximately uniform thickness peripherally around the outer portion of the outer chamber of separation space 11. The exact position of liquid liquid interface 40 can be controlled by the rate at which the heavy liquid is fed to passageways 16 and 17. As the heavy liquid passes around peripheral opening 13, it entrains or picks up the solid particles at the interface and carries them upward and out of the centrifuge bowl through discharge outlet 18, passing over weir 43. The rate at which heavy liquid 34 is fed to passageways 16 and 17 determines the horizontal radial distance H at which the heavy liquid crests over weir 43. This horizontal radial distance is related to the position of the liquid liquid interface in the peripheral area of separation space 11. Increasing the rate at which the heavy liquid is fed to passages 16 and 17 increases the cresting height H which causes a readjustment in hydrostatic balance moving the liquid interface 40 radially inward. Conversely, decreasing the feed rate moves the interface outward.

In the above description, housing 25 and the heavy liquid and feed conduits are satisfactory. Centrifuge bowl 41, conical shells 9 and 10 and center post 6 are all joined together in a conventional manner and rotate at a high speed as a single unit.

Applicant's invention provides an apparatus and method by which solids are collected at a liquid liquid interface and a process by which the exact position of this interface can be controlled while the centrifuge is in continuous operation, without the necessity of stopping the machine to make mechanical adjustments for normal density variations in the feed or recycle liquid fed to the centrifuge. The above description has been given with the simplest possible configuration wherein solids are separated from a single liquid and a separate auxiliary heavy liquid is used to remove the solids and position the interface. In a similar manner, solids could be separated from a liquid containing two liquids of different densities wherein the heavier liquid would be removed with the solids. Under certain circumstances, some of the heavy liquid component 34 is added to the light liquid solids feed in order to coat the internal surfaces of the centrifuge and to provide a surface on which the solid particles 35 might float and pass outward and not stick to the internal surfaces of the centrifuge.

In a specific embodiment of this invention, referring to FIGURE I of the drawing, a crystallized wax-oil mixture containing about 5-10% by volume of a 28% calcium chloride brine solution is fed to the centrifuge through line 1. In this particular embodiment wherein the centrifuge is used to separate wax crystals from dewaxed oil, the heavy recycle liquid selected is calcium chloride brine which has a greater density than either the wax crystals or the dewaxed oil. The crystallized wax-oil feed can be obtained, for example, from the immiscible brine dewaxing process described in copending U.S. Ser. No. 135,092 or conventional propane or MEK-TOL dewaxing. The brine introduced with the feed and being more dense than the feed forms a coating on the inner side of discs 7 on which the wax crystals 35 can float without coating and plugging the disc surfaces. The brine also coats the inner surface of conical shells 9 and 10 which act as dividing cones.

The circular rotation of the centrifuge thrusts the wax crystals which are heavier than the oil 33 outward, concentrating them at the brine oil interface 40 while the lighter oil, free of wax crystals, is removed from the top of the centrifuge through discharge outlet 19. A separate recycle brine river 34 is introduced through line 28 into the centrifuge and passes through passageways 16 and 17 around peripheral opening 13 and controls the position of interface 40 and gradually erodes away the accumulated wax crystals from interface 40, removing them with the brine solution through discharge outlet 18. The brine recycle rate is controlled by conventional valve and pumping means. The outer surface of conical shells 9 and 10 and the inner surfaces 14 and 15 of the centrifuge bowl provide the containing surfaces for the brine recycle river 34. The heavy brine liquid containing wax crystals 35 is collected in chamber 20 of the centrifuge housing 25 and is removed from the housing via conduit 21 and is collected in a wax brine collection tank not shown.

In the collecting tank, the wax crystals float to the surface of the brine and can be removed from the brine by skimming it from the surface or by draining the brine from the wax crystals. The small amount of brine remaining in the separated crystals can be removed by melting the crystals and decanting the lower brine layer.

By controlling the brine river recycle rate, the brine crest H at discharge port 18 is regulated as to its horizontal radial height. This, in turn, regulates the position of the oil brine interface 40 relative to the peripheral opening 13 between conical shells 9 and 10 which determines the amount of wax which is eroded away by the brine river stream 34. In order to obtain efficient separation of the oil from the wax, it is necessary to accurately position the oil wax interface so that no wax passes out with the oil and a minimum amount of oil passes out with the wax. Heretofore, accurate positioning of the interface could only be accomplished by carefully selecting the oil ring dam radius. Any variations in the densities of the feed materials charged to the centrifuge or of the concentration of the solids would move the previously established oil brine interface and would necessitate stopping the centrifuge and mechanically readjusting the oil ring dam radius. Collection of the wax crystals at the liquid liquid interface provides a uniform layer of collected wax on the heavy brine interface and has overcome the problem of solids buildup between discharge nozzles in a conventional centrifuge.

In another embodiment of the invention, a novel bowl shell is employed. The bowl shell illustrated in FIGURE I of the drawings is conical in shape because in the conventional nozzle machines it was found necessary to have this shape to direct solids being separated to nozzles located at the periphery of the rotating bowl. Applicant found that in using the heavy wash liquid technique in accordance with this invention that though the conventional conical shaped machines (the separation chamber was conically shaped) were efficient that due to the conical shape of the bowl some undesirable solids flow effects resulted. For example, in dewaxing as the wax solids flow radially outward, they are deformed by the contraction in volume of the centrifuge bowl at the periphery of the bowl. In addition, the contraction gives rise to a non-uniform pattern through the wax region, making inefficient use of the volume available in the compaction zone.

Another consequence of the contraction is that it limits the volume available for compaction, particularly at the outer radius of the bowl, which is undesirable because this is the region of maximum gravitational force.

In accordance with this embodiment illustrated in FIGURE IA of the drawings, the bowl shell has a cylindrical cross section in the wax compaction region. That is, the compaction region which extends from the outermost edges of discs 7 and 8 horizontally outward to the outer edge of members 8 and 10 is cylindrical in shape. In this design, the volume outside of the disc stack does not contract. This novel design results in a substantial increase in compaction volume in the area of the centrifuge of maximum gravitational field and provides a substantially increased surface area of heavy wash liquid on which the solids can collect and from which the solids can be entrained and removed from the centrifuge. Using this new bowl design in conjunction with the heavy wash liquid technique allows the solids to deposit at the liquid liquid interface uniformly along the longer vertical interfacial surface, allows longer residence time, and provides higher throughput at the same quality of dewaxed oil.

This embodiment can be better described with reference to FIGURE IA of the drawings. The operation of the centrifuge is similar to that described with reference to FIGURE I of the drawings. The apparatus changes, however, have resulted in substantial operational advantage. The numbering of FIGURE IA is the same as FIGURE I and defines the same parts of the centrifuge. The primary difference is in the inside geometry of the centrifuge bowl. Conical member 9 extends outward and downward parallel to the inner wall 14 of top portion 27. However, at a point about opposite the outer edge of conical top disc 8, top conical member or dividing cone 9 extends about horizontally and radially outward towards the peripheral area of the centrifuge bowl terminating at a point inward of the inner wall of centrifuge bowl 41 formed by the about vertical side wall of top portion 27 and bottom portion 26. Bottom conical member or dividing cone 10 extends downwardly about parallel to bottom disc in the disc stack and at a point below the outermost edge of the bottom disc extends about horizontally and radially outward towards the peripheral area of the centrifuge bowl terminating at a point inward of the inner wall of centrifuge bowl 41 and at about the same radial distance as member 9. The outermost edges of members 9 and 10 form between them peripheral opening 13. The centrifuge is operated in a similar manner to that described in relation to FIGURE I. When in operation, the heavy brine recycle liquid 34 is fed at a sufficiently high rate to fill the volume extending outward from about the edges of members 9 and 10 and to substantially fill passages 16 and 17 and overflow weir 43. Light liquid component containing solids is fed through line 1 and fills the disc stack volume (the inner separation chamber 11) and the compaction volume (the outer separation chamber 11) and forms a liquid liquid interface 40 with the heavy recycle liquid 34 at about peripheral opening 13. The brine river recycle rate is controlled so as to maintain the interface at about the outermost extension of members 9 and 10 but inside of the outer edges. Though inside the outer edges the interface is not allowed to extend sufficiently inward so as to reach the outer circumference of discs 7. If the interface is situated too far inward, the wax will not discharge with the recycle liquid and/or the discs will become clogged wtih wax. If it extends too far outward, oil will leave with the wax and brine river recycle stream.

The solids 35, due to the imposed gravitational field, are separated from the oil and thrown radially outward and concentrate at the oil heavy liquid interface 40 floating on the heavy liquid. The gradual buildup of wax forms a wax layer which extends around the inside of the centrifuge bowl. The wax layer is cylindrically shaped. This forms a large vertically disposed, unsupported wax cake between the heavy liquid and the lighter oil layer.

In order to strengthen the wax cake and to prevent failure of the cake, one or more washer shaped guide vanes 51 and 52 can be provided which extend about horizontally and radially outward from about the outer edge of discs 7 to about the same distance as the outermost extension of members 9 and 10 and the liquid liquid interface 40. In addition to providing support for the wax cake, the guide vanes also provide for more even outward linear flow of the wax particles and more uniform disposition of the wax particles at the interface 40.

The guide vanes are important to efficient operation for several reasons. Without guide vanes the wax solids would tend to deposit in a less uniform manner and could result in cake failure. Also, the action of the heavy wash stream external to the wax cake causes turbulence which could tend to crack the long unsupported cake and could cause failure of the cake. Also, a large portion of the wax that is entrained in the wash liquid is removed from the cake at a point immediately below the outer edge of member 9. If guide vanes are not used, most of the wax is removed at that point. However, with guide vanes 51 and 52, wax is also entrained from points immediately below the outer edge of vanes 51 and 52 providing a more uniform removal of wax from the wax cake at peripheral openings 13A, 13B, and 13C.

In the operation of the centrifuge, the interface is located at a point just inside the outer edges of members 9, 10 and vanes 51 and 52. As the oil solids wax feed is fed to the centrifuge and the wax separated from the oil, the wax layer builds up forming a cake at the interface 49. As the cake becomes heavier it pushes or sinks into the brine layer and is carried away entrained in the heavy brine stream. After adjusting the feed rate at a desired level more exact positioning of the liquid liquid interface in relation to the outer edges of conical members 9 and 10 and members 51 and 52 is obtained by adjusting the brine recycle rate (utilizing a conventional valve means) to obtain wax with a minimum amount of entrapped oil. The effect of oil content in the wax obtained by controlling the brine river recycle rate has already been discussed in relation to, for example, FIGURES I and VI of the drawings. The operation of the centrifuge is otherwise similar to that already discussed. Guides 51 and 52 are supported in a conventional manner familiar to those skilled in the art.

In a preferred embodiment of the invention, wherein the centrifuge is used to separate the precipitated wax crystals from a hydrocarbon oil feed, baffles constructed in the manner described in FIGURE III of the drawings, or orifice plates described in FIGURE II of the drawings, or honeycomb sections as described in FIGURE IV, are attached in the volume space between the outer edge of discs 7 and peripheral opening 13. The wax crystals collecting in the region of the brine liquid surface, compact and squeeze out of the crystals a certain amount of the occluded oil. Applicant unexpectedly found that, disturbing the wax by providing baffles, orifice openings, or honeycomb sections through which the wax crystals must pass in passing through the brine oil interface, releases substantially more oil due to the weakening and break-up of the initially formed wax matrix. Auxiliary brine openings may be used to enhance the breaking action and the flushing of the disturbing means.

Other utilities and applications than those described above will be obvious to one skilled in the art. An important feature of the invention is in accurately positioning the liquid liquid interface in a centrifuge, without necessitating stopping the centrifuge that can be applied to any centrifuge separation process. Thus it may be used to position the interface and separate two liquids, liquid from a single solid, two liquids of different densities from a solid, two liquids of different densities, and two solids of different densities, etc.

One such application is in the separation of solid particles from a light liquid and a heavy liquid mixture wherein the solids are heavier than the heavy liquid and instead of floating on the heavy liquid pass out through the peripheral opening and swept away by the heavy recycle liquid. In this case, the liquid being removed from the feed would also be the recycle liquid. Exact position of heavy liquid light interface allows efficient removal of solids without carryover of light liquid. An example would be separation of oil water emulsions containing solid sediment.

In some applications it is advantageous to operate these centrifuges in series. By doing so, the overall capacity per machine is increased over and above that obtained if the machines were operated in parallel. For example, in dewaxing, the overall capacity of a machine for removal of occluded oil from wax is increased.

The invention is further exemplified by the various runs reported in the following examples:

*Example 1*

In one embodiment of this invention, a solvent neutral 100 waxy hydrocarbon stock wax is mixed with liquid propane. The solution so produced is chilled by evaporating part of the propane to a temperature of −45° F. in order to precipitate wax in a conventional propane dewaxing operation. The oil solution containing precipitated wax, and between 1.5 to 3.0 volumes of propane to volume of wax and oil, is then fed to a 30 inch centrifugal separator modified in accordance with the invention at a rate of 80 to 280 gallons per minute of wax oil feed (i.e., not including solvent) with about 5 percent by weight of brine solution based on the feed. The heavy brine solution coats the internal surfaces of the centrifuge and provides a thin film of brine on which the solid wax particles float as they are thrown outward by centrifugal force of the centrifuge. The mixture of oil and wax passes from the inlet feed chamber into the separating chamber of the centrifuge and the wax is stratified from the oil by the stratifying discs, which form the inner part of the separating chamber, and is thrown outward into the outer part of the separating chamber. A brine recycle stream is introduced into the closed passageway and is passed around the separating chamber at a sufficient rate to position the brine oil interface approximate to, but with the peripheral opening which communicates with the separating chamber and the brine recycle passage. A uniform layer of wax particles collects at and floats on the brine liquid interface approximate to the peripheral opening. As the wax particles pass outward, the oil separated from the wax passes inwardly into the disc block and axially upward and is discharged through oil discharge outlet 19. The wax collected at the brine interface is continuously removed by being eroded away by the recycle brine river and is removed from the centrifuge through discharge outlet 18. Any change in density of the feed to the centrifuge, which relocates the brine oil interface, is compensated for by changing the recycle rate of the heavy brine liquid.

FIGURE X of drawings graphically shows the centrifuge capacity of a 30-inch commercial centrifuge modified in accordance with this invention as related to the solvent oil dilution ratio feed to the machine. Curve A represents the feed rate of combined solvent and oil feed, and curve B is the undiluted feed rate. The feed comprised solvent 100 neutral and the oil content of the separated wax was 25% SBA° F. The ration of propane solvent used is as indicated.

As has been previously stated, conventional disc stack centrifuges suffer from several difficulties in operation. The most critical one is the need to accurately locate the interface between the two phases being separated at a fixed position relative to the bowl. This is necessary to obtain maximum separation of the two phases. However, any changes in density of a feed, due to temperature or inherent density variations, will cause the interface to be moved. Normally, this would be compensated for by stopping the centrifuge and changing ring neck dams located at either (referring to FIGURE I) discharge outlets 18 or 19. The use of the auxiliary heavy phase recycle stream in accordance with this invention, allows the continuous positioning of the interface to maintain optimum separation of the phases.

The effect on the efficiency of separation of oil from precipitated wax, as related to the heavy liquid recycle rate, is shown graphically in FIGURE VI, of the accompanying drawings. By adjusting the recycle rates, the interface position is accurately controlled.

The accompanying data for FIGURE VI was obtained with the centrifuge operating at 12,320 g's a constant waxy oil feed rate, and without any added internals to disturb the wax matrix. Varying the brine river recycle with the concomitant adjustment of the liquid liquid interface position reduced the oil content in the wax product from about 55% to about 43% (by mass balance).

*Example 2*

A Kuwait heavy distillate boiling in the range of about 640° F. to 730° F., having a cloud point of about 42° F. and a pour of about 40° F., and containing about 10 percent by weight of wax with a 1:1 ratio of MEK solvent to oil feed, was countercurrently contacted and the wax crystallized in accordance with the procedure described in copending Ser. No. 135,092. A wax oil slurry containing about 5 percent by volume of occluded brine was removed from the top of the contacting tower. This was charged to a 9-inch nominal disc stack centrifuge operating at 10,000 r.p.m., modified in accordance with this invention, as described in FIGURE I of the drawings, at a rate corresponding to 45 gallons of oil wax slurry per minute. The corresponding brine recycle rate to maintain the brine oil interface in the desired position for wax removal was 0.97 to 1.91 gallons per minute of recycle brine, which would compensate for a variation in specific gravity of the oil feed of 0.85 to 0.89, respectively. By regulating the brine recycle rate, the interface location could be changed continuously without stopping the machine, to compensate for a change in specific gravity of the oil feed. This invention overcomes the necessity of stopping an unmodified disc stack centrifuge to change the ring dam diameter to compensate for a change in specific gravity of the oil feed.

*Example 3*

Applicant found that in the conventional conical shaped bowl that the contraction in the compaction zone encouraged the formation of stagnant wax pockets which reduced the effective compaction volume. The clarification of solids from liquid takes place in the disc region of the centrifuge. The clarification efficiency controls, for example in centrifuging wax from oil, the pour and cloud points of the oil product. The efficiency of the compaction region, however, controls the oil content of the wax.

It was unexpectedly found that increasing the volume of the compaction zone of the centrifuge by the construction of a cylindrically shaped compaction zone, that is, by extending the sides of the centrifuge, starting at about the outer extension of top and bottom discs, horizontally and radially outward to the same maximum radius as the conical shaped bowl, that an increase in centrifuge capacity of about more than 400 percent would result under substantially the same operating conditions and with the same produce oil quality.

To illustrate this effect in increased overall centrifuge capacity, a centrifuge of the design shown in FIGURE I is fed a waxy oil feed consisting of solvent 100 neutral (3/1 volume of hexane) which had been chilled at 100° F./minute at a rate of 2.2 g.p.m. The oil content of the wax product obtained is 30.5% (SBA @ 0° F.), and the separated oil has a pour of 20° F. A second centrifuge of the design of FIGURE IA which has the same inside bowl diameter as the centrifuge of FIGURE I but which has the cylindrical shaped bowl is operated under the same conditions and with the same feed. The centrifuge is operated to give an oil with a 20° F. pour. The second centrifuge is operated at a feed rate of about 9.4 g.p.m. and gives an oil with a 20° F. pour and a wax product with an oil content of 28% (SBA @ 0° F.). The new bowl design not only increases the overall capacity of the centrifuge by over 400% while producing an oil of the same pour but, in addition, produces a wax product of lower oil content. The effectiveness of carrying the separation in the conventional conical shaped bowl as compared with the cylindrical shaped bowl is summarized below.

|  | Conical Shaped Bowl | Cylindrical Bowl |
| --- | --- | --- |
| Pour of Oil, °F | 20 | 20 |
| Oil content of wax (SBA at 0° F.) | 30.5 | 23 |
| Capacity, g.p.m. | 2.2 | 9.4 |
| Relative compaction volume | 1.0 | 1.50 |

The above information shows that by increasing the compaction volume in accordance with applicant's novel design by 50 volume percent that an overall increase in the capacity of the centrifuge of over 400% can be obtained. This is a completely unexpected increase in overall capacity.

In the conical shaped bowl design, applicant found that the only volume of the compaction zone that was effective was that zone projected horizontally inward from peripheral opening 13, referring to FIGURE I. In the cylindrical shaped bowl, referring to FIGURE IA, the entire volume is effective in compacting the wax with the added advantage that a large part of the increased compaction volume is in the area of the centrifuge of the highest gravitational field. The cylindrical design removes the stagnant wax regions and provides even flow of solids radially outward.

Obvious variations of the design as slight deviations from the horizontal of the guide vanes or the top of the cylindrical shaped chamber, or deviation from the vertical of the sides of the chamber are considered to be within the scope of this invention though pointed out as to be not preferred. Angular acceleration of the solids and liquids in the centrifuge is provided by conventional vertically disposed radially oriented acceleration vanes 12 and/or similar means, such as radial tubes or ducts in place of passages 16 and 17 through which the liquids must pass.

*Example 4*

Though high solvent dilution rates are generally employed in the separation of wax from oil, because it reduces the viscosity of the system, and also exchanges entrained solvents for entrained oil, applicant unexpectedly found that, in separating crystallized wax from oil in a disc stack centrifuge, it is more efficient to minimize the amount of solvent present during crystallization.

Applicant found that means which can be employed to weaken the strength of wax crystal structure during the compaction stage in the centrifuge, that is, as it collects and forms a matrix, will lower the amount of oil occluded by the wax matrix, by increasing the amount of compaction which occurs under a given gravitational force and/or residence time. Reducing the solvent dilution ratio during crystallization weakens the crystal structure and greater compaction is obtained.

This effect is illustrated in FIGURE VIII of the drawings wherein various dilution ratios used during crystallization are plotted against the volume percent oil in the wax matrix on centrifuging at various relative gravitational forces. If a high solvent dilution ratio is required in the centrifuge to reduce the oil content of the liquid occluded in the wax matrix and/or reduce the viscosity of the system, the crystallization step should be carried out with a minimum amount of solvent and the remainder of the solvent added cold after the crystallization.

*Example 5*

In a preferred embodiment of the invention, it was found that, by disturbing the wax matrix by mechanical means during compaction in the outer separation chamber of the centrifuge, a substantial reduction in the amount of occluded oil in the wax matrix is obtained. Various mechanical means can be utilized as, for example, those described in FIGURES II, III, and IV of the drawings. The use of baffles or orifice plates, for example, which weaken and break up the wax matrix after its initial formation in the compaction region, allows greater compaction and release of occluded liquids. A secondary brine stream may be added behind the internals used to break up the wax matrix to facilitate passage of the wax into the brine river.

The rate controlling factor in the removal of wax from oil by centrifugation is the compaction step in which the wax matrix, that is, the wax crystal bed, is compressed under the force of the gravitational field to remove the occluded liquids. Curve A of FIGURE VII shows that lowering the oil content of the wax matrix requires the expenditure of a large amount of gravitational force. Applicant found that disturbing the wax matrix, after initial formation (curve B), will promote breakdown of the wax crystal structure under the force of gravity and allow a low oil content wax to be obtained at lower gravitational force.

During centrifugation, normally two crystal matrixes are obtained. The first is a loose agglomeration of crystals in a cake which can be recompressed. Eventually, a second stage is obtained in which the crystals are compressed to a maximum. Even so, there are still voids between the crystals which contain oil but, for further compaction, the crystal width will have to be altered. As shown in FIGURE VII of the drawings, disturbing the wax crystal matrix after the loose agglomeration of crystals is formed produces a very marked lowering in the amount of gravitational force required to produce an equivalent oil content wax cake. For example, an oil content of 30 percent without disturbance (curve A) would require a gravitational force of 5,000 $g$'s. With a disturbance, the gravitational force required was reduced to 1500 $g$'s (curve B).

Disturbing the wax matrix reduces the required $g$'s for a specified oil content wax, thereby allowing the construction of a larger centrifuge for a given separation with an equivalent increase in capacity or effectively reduces the oil content of the wax at a constant capacity.

The data represented in FIGURE VII was obtained by batch centrifuging a Barosa 56 oil containing precipitated wax crystals, MEK/Tol. solvent at a ratio of 56/44 and a solvent-to-oil ratio of 2.5/1. The only difference in the reported runs was in case (B) where the initially formed wax matrix was broken up.

*Example 6*

In order to further show the effect of breaking the wax matrix in a continuous operation by means of internal obstructions to the wax flow in the compaction zone, i.e., the outer separation chamber, several runs were carried out. In each run, a Kuwait heavy distillate boiling in the range of about 640 to 730° F. was treated in the same manner as Example 2 to precipitate the wax present. The resulting oil wax solvent slurry was fed to a centrifuge modified in accordance with this invention and also having in the compaction zone orifice plates, as shown in FIGURE II of the drawings, to disturb the formation of the wax matrix. The same feed was fed to the centrifuge at a constant feed rate and without altering any of the other variables except as follows: The first run represented by curve A, FIGURE IX, was carried out at 12,320 $g$'s with no compacting baffles. The amount of oil in the separate wax as related to the brine recycle rate is as illustrated. In the second run, the feed was centrifuged at 2400 $g$'s in the identical centrifuge, modified only by the addition of compaction baffles. The data obtained is represented by curve B of FIGURE IX.

Comparison of curves A and B clearly shows that substantially the same reduction in content of occluded oil in wax can be obtained by using compaction baffles at approximately ⅕ the $g$'s required without the use of baffles. The third run was carried out at 6400 $g$'s with compaction baffles and shows a dramatic reduction in the product oil content. This reduction was obtained at about ½ the gravitational force used in the run without baffles at 12,320 $g$'s.

At a brine recycle rate of 1.5 g.p.m. and at 6400 g's (with baffles) a separated wax containing about 28% oil (mass balance) was obtained, whereas at about twice the g's (12,320) without baffles, the oil in the product wax was only reduced to about 43% (mass balance). Therefore, a substantially greater reduction in the oil content of the wax can be obtained at about ½ the centrifugal force by using the compaction baffles of this invention, without sacrificing throughput volume.

It will be obvious that the new centrifuge provides an efficient means for feeding an auxiliary liquid into the centrifuge and for automatically controlling the liquid liquid interface by controlling the rate at which this liquid is fed into the centrifuge. By the use of peripheral interspaces 16 and 17, the auxiliary liquid is distributed uniformly around separation space 11. The invention is not to be limited by any of the previous description, or theory of operation, but only by the appended claims.

What is claimed is:

1. A centrifuge comprising a bowl shell rotatably mounted about an axis having a separating chamber, comprising an inner separating chamber, comprising frusto conical disc stack, an outer separation chamber comprising a cylindrically shaped annular volume extending about horizontally outward from about the outer edge of the topmost disc and from the outer edge of the bottom most disc to a point inward of the continuous vertically disposed inner wall of the sides of the centrifuge bowl, the uppermost limit of the chamber consisting of the outward horizontal extension of the bottom side of the super-imposed conical shaped dividing cone placed above the disc stack and the bottom most limit of the chamber consisting of the horizontal extension of the bottom super-imposed conical shaped member, the outward extension of the top and bottom members terminating at a point inward of the inner wall of the sides of the centrifuge, means for introducing a feed to be separated, separate means for removing the liquid and solids, separate means for introducing a heavy wash liquid, and means for controlling the rate of introduction of the feed and wash liquid and means for removing the wash liquid.

2. The apparatus of claim 1 wherein there is provided at least one washer shaped guide vane, evenly spaced between the top and bottom dividing cones, extending from a point at about the outer edge of the disc stack about horizontally outward to a point at about where the top conical dividing cone and the bottom conical dividing cone terminate and inward of the inner wall of the sides of the centrifuge bowl.

3. In a centrifuge suitable for the separation of a liquid-solids mixture where a liquid-liquid interface is established with a second liquid of greater density than the first liquid and said solids are passed outwardly across said interface into said second liquid to form a second liquid-solids mixture, said centrifuge comprising a frustoconical disc stack and a bowl shell having a top wall, bottom wall and a circular sidewall, said frustoconical disc stack and bowl shell being rotatably mounted about a central axis, said bowl shell containing a separating chamber and an annular passageway extending radially outward from said separating chamber to said sidewall, said annular passageway communicating with said separating chamber through a peripheral opening, said centrifuge having a first inlet means, including an air gap, for the first liquid-solids mixture, said first inlet means communicating with said separating chamber, a second inlet means, including an air gap, for said second liquid, said second inlet means communicating with said passageway, a first outlet means for said first liquid communicating with said separation chamber and a second outlet means for the said second liquid-solids mixture communicating with said passageway, the improvement consisting of a system for accurately positioning the location of the liquid-liquid interface without stopping operation of the centrifuge, said system comprising in combination:

(1) control means for adjusting the feed rate of said second liquid; and
(2) an overflow weir located in said second liquid-solids mixture outlet means, said weir being so constructed and arranged as to produce a horizontal crest in the second liquid-solids mixture overflowing said weir.

whereby an increase in the feed rate of said second liquid results in moving said liquid-liquid interface radially inward while a decrease in said feed rate results in moving said interface radially outward.

4. In a centrifuge suitable for the separation of a liquid-solids mixture where a liquid-liquid interface is established with a second liquid of greater density than the first liquid and said solids are passed outwardly across said interface into said second liquid to form a second liquid-solids mixture, said centrifuge comprising a frustoconical disc stack and a bowl shell having a top wall, bottom wall and a circular sidewall, said frustoconical disc stack and bowl shell being rotatably mounted about a central axis, said bowl shell containing a separating chamber and an annular passageway extending radially outward from said separating chamber to said sidewall, said annular passageway communicating with said separating chamber through a peripheral opening, said centrifuge having a first inlet means, including an air gap, for the first liquid-solids mixture, said first inlet means communicating with said separation chamber, a second inlet means, including an air gap, for said second liquid, said second inlet means communicating with said passageway, a first outlet means for said first liquid communicating with said separation chamber and a second outlet means for the said second liquid-solids mixture communicating with said passageway, the improvement consisting of solids disturbing means positioned within said separating chamber so as to be contiguous with said peripheral opening, said solids disturbing means being positioned radially inward of said liquid-liquid interface, whereby said first liquid-solids mixture passes radially outward through said disturbing means and any solid particle matrix formed by said solids is broken up thereby releasing any occluded first liquid contained therein.

5. The improved centrifuge of claim 4 wherein said solids disturbing means comprises radial conduits formed into a honeycomb section.

6. The improved centrifuge of claim 4 wherein said solids disturbing means comprises orifice plates.

7. The improved centrifuge of claim 4 wherein said solids disturbing means comprises baffle plates.

References Cited by the Examiner

UNITED STATES PATENTS

| | | | |
|---|---|---|---|
| 1,232,104 | 7/1917 | Sharples | 233—14 |
| 1,482,418 | 2/1924 | Unger | 233—29 |
| 2,645,415 | 7/1953 | Strezynski | 233—28 |
| 2,685,369 | 8/1954 | Crossley | 233—14 XR |
| 2,808,201 | 10/1957 | Mayeux | 233—28 |
| 2,837,273 | 6/1958 | Sullivan | 233—14 |
| 2,937,985 | 5/1960 | Fear | 208—33 |
| 2,952,609 | 9/1960 | Dobson et al. | 208—33 |
| 3,027,390 | 3/1962 | Thurman | 233—29 XR |
| 3,117,928 | 1/1964 | Thylefors | 233—29 XR |

FOREIGN PATENTS 408,926  7/1932  Great Britain.

M. CARY NELSON, *Primary Examiner.*

H. KLINKSIEK, *Assistant Examiner.*